(No Model.)

J. C. THORNTON.
APPARATUS FOR CLEANING OIL.

No. 337,459. Patented Mar. 9, 1886.

Witnesses:
O. P. Hood.
V. M. Hood.

Inventor:
John C. Thornton,
By H. P. Hood
Atty.

UNITED STATES PATENT OFFICE.

JOHN C. THORNTON, OF MOUNT VERNON, INDIANA.

APPARATUS FOR CLEANING OIL.

SPECIFICATION forming part of Letters Patent No. 337,459, dated March 9, 1886.

Application filed September 21, 1885. Serial No. 177,673. (No model.)

*To all whom it may concern:*

Be it known that I, JOHN C. THORNTON, a citizen of the United States, residing at Mount Vernon, in the county of Posey and State of Indiana, have invented a new and useful Improved Apparatus for Cleaning Oil, of which the following is a specification.

My invention relates to an improvement in an apparatus for cleaning oils, for which Letters Patent No. 313,693 were granted to me March 10, 1885. The apparatus for which said Letters Patent were granted consists, essentially, of an elevated tank for receiving the dirty oil, and a lower tank in which steam-heated filtering and settling chambers are constructed, and a portion of which tank serves also as a storage-chamber for the cleaned oil, the arrangement being such that the oil is forced by hydrostatic pressure through the filter and into the storage-chamber.

The object of my improvement is to combine with an elevated tank for receiving the dirty oil and a lower storage-tank for the cleaned oil a filtering and settling chamber of novel construction, and so arranged as to be separate from said tanks, but connected therewith by suitable pipes in such a manner as to be convenient of access for cleaning, and in which the movement of the oil through the filter shall be due not only to the hydrostatic pressure, but also to a circulation established by a portion of the oil being heated, all as hereinafter fully described.

Figure 1:
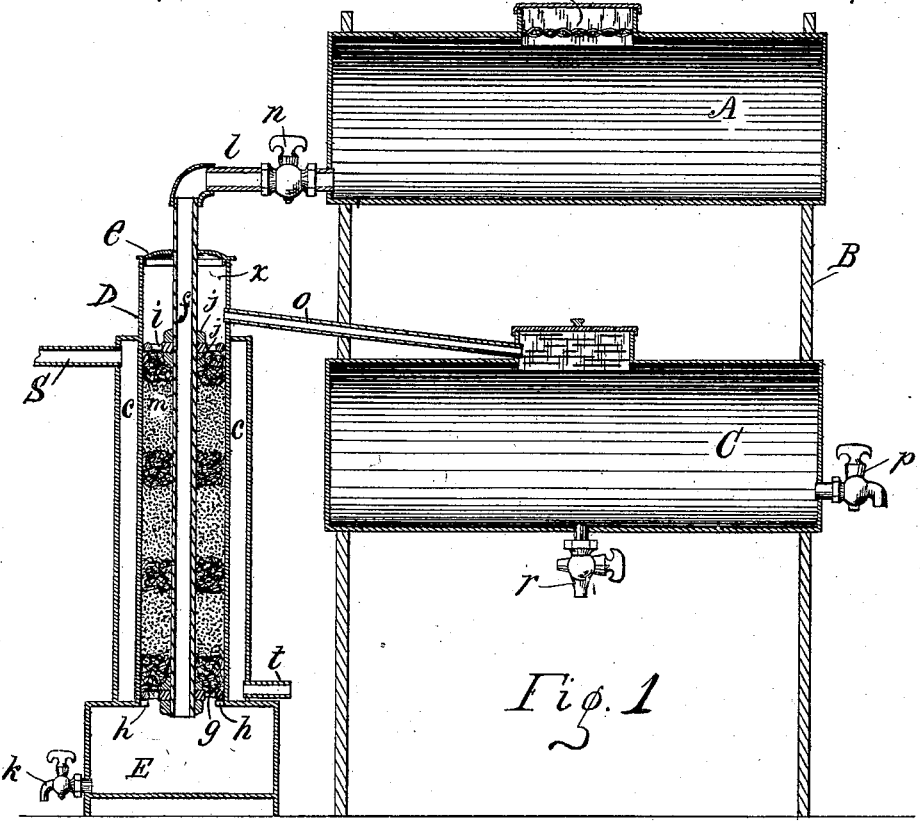
Figure 2:
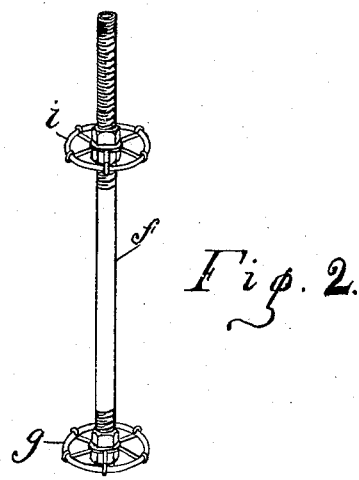

The accompanying drawings illustrate my invention. Figure 1 represents a vertical section of the entire apparatus. Fig. 2 represents a view in perspective of the removable support for the filtering material.

A is the tank for the reception of the dirty oil, which is poured in through the strainer *a*. Said tank is mounted in a suitable elevated frame, B, which sustains also, below tank A, the storage-tank C.

D is a cylindrical filtering-chamber set vertically, and having for a portion of its length double walls with an annular steam-space, *c*, between them. The top of chamber D is closed by a cover, *e*, through which a pipe, *f*, passes centrally down to the bottom of the steam-jacketed portion.

To the lower end of pipe *f* is fastened centrally a skeleton disk, *g*, which fits loosely the interior of D, and rests on lugs *h h*, secured to the walls. A second skeleton disk, *i*, is secured to pipe *f*, near the top of the steam-jacket, the pipe being screw-threaded, and the disk sustained by screw-collars *j j*, so that it may be adjusted vertically on the pipe.

The interior of chamber D, between the disks *g* and *i*, is filled with any suitable filtering material, *m*. I find the best results to be produced by the use of alternate layers of wool and poplar-wood sawdust, or animal charcoal, their relative proportions varying for oils of different density, a greater proportion of sawdust or charcoal being required for the lighter oils.

That portion of the cylinder D below the disk *g* is preferably made of larger diameter than the rest, and forms a settling-chamber, E, in which the coarser particles of dirt and any water which the oil may contain are deposited, and are drawn off through the faucet *k*. The upper end of pipe *f* projects above the top of the filtering-chamber, and is connected by a suitable coupling with a pipe, *l*, leading from the receiving-tank A, and having a suitable valve, *n*. A pipe, *o*, connects the clear space *x* in the filtering-chamber D, above the filtering material, with the storage-tank C, in which is a faucet, *p*, through which the cleaned oil may be drawn as needed for use. A petcock, *r*, permits the escape of all the oil from tank C, when desirable.

S is a pipe leading from a source of steam-supply to the annular space *c* around the filtering material. A waste-pipe, *t*, takes the condensed steam from the space *c*.

The operation of the apparatus is as follows: Dirty oil—such as is collected from the drippings of lubricated journals in machinery—is poured into tank A, all chips and like dirt being separated therefrom by the strainer *a*. Steam having been admitted to the steam-space *c*, the oil is allowed to flow through pipe *f* to the settling-chamber E, where all of the water (which is found to some extent in drippings from engine-cylinders) and the heavier particles of dirt are separated from the oil by force of gravitation. The oil is forced by the hydrostatic pressure from tank A upward through the filtering material *m* into the clear space *x*, and over through pipe *o* to the storage-tank C. As the oil comes in contact with the steam-heated surface of the filtering-chamber it is heated and is rendered more fluid, and the upper portion of the column of oil being heated more than that in the settling-chamber the upward circulation of the oil is greatly facilitated and the dirt readily deposited in the filtering material.

When the filter has become foul, pipe $f$ is disconnected from tank A and connected with the steam-supply. Faucet $k$ is then opened, and the water and dirt in the settling-chamber is blown out by a current of steam passed through pipe $f$. The steam-pipe is then disconnected and cover $e$ removed. Pipe $f$, with its disks and the filtering material, is then lifted out of cylinder D and the filtering material cleansed.

I claim as my invention—

1. In an oil-cleaning apparatus, the elevated receiving-tank, the filtering-chamber containing filtering material and having a clear space forming a settling-chamber below the filtering material, a pipe leading from said tank through the filtering material to said settling-chamber, and an annular steam-chamber surrounding the filtering material, all combined and arranged to co-operate substantially as and for the purpose specified.

2. In an oil-cleaning apparatus, the elevated receiving-tank, the storage-tank arranged below the receiving-tank, the filtering-chamber containing filtering material and having a clear space forming a settling-chamber below the filtering material and a second clear space above said filtering material, a pipe connecting the settling-chamber with the receiving-tank, and a pipe connecting the filter-chamber with the storage-tank, all combined and arranged to co-operate substantially as specified.

3. The combination, with the filtering-chamber D and the settling-chamber E, of the removable filtering-material support, consisting of the pipe $f$ and disks $g$ and $i$ secured thereto, whereby the filtering material is supported and the oil conducted through said material to the settling-chamber, as and for the purpose specified.

JOHN C. THORNTON.

Witnesses:
CHARLES J. CARPENTER,
M. CRONBACH.